United States Patent [19]

Washizuka et al.

[11] 3,973,111

[45] Aug. 3, 1976

[54] CALCULATOR HAVING THERMAL PRINTING HEAD

[75] Inventors: Isamu Washizuka, Kyoto; Shintaro Hashimoto; Hirotoshi Matsui, both of Nara, all of Japan

[73] Assignee: Sharp Kabushiki Kaisha, Osaka, Japan

[22] Filed: July 19, 1974

[21] Appl. No.: 490,006

[30] Foreign Application Priority Data

| | | |
|---|---|---|
| July 19, 1973 | Japan | 48-86317 |
| July 19, 1973 | Japan | 48-86318 |
| Aug. 10, 1973 | Japan | 48-90171 |

[52] U.S. Cl. .......... 235/156; 219/201; 219/216

[51] Int. Cl.² .......... H05B 1/00; G06F 3/12

[58] Field of Search .......... 235/156, 159; 219/201, 219/216; 346/76; 340/172.5

[56] References Cited

UNITED STATES PATENTS

| | | | |
|---|---|---|---|
| 3,405,392 | 10/1968 | Milne et al. | 235/156 |
| 3,501,615 | 3/1970 | Merryman et al. | 219/201 |
| 3,819,921 | 6/1974 | Kilby et al. | 235/159 |
| 3,870,856 | 3/1975 | Taniguchi | 235/156 |

*Primary Examiner*—Malcolm A. Morrison
*Assistant Examiner*—Errol A. Krass
*Attorney, Agent, or Firm*—Stewart and Kolasch, Ltd.

[57] ABSTRACT

Disclosed is an electronic calculator which has a thermal printing head or active printing area exposed to the ambient environment to enable printing in a stamp-like fashion. In the preferred form, the thermal printing head comprises a predetermined number of thermal printing units each unit having a plurality of segment-shaped resistors. More particularly, a metal layer of platinum, nickel-chrome alloy, etc., is deposited in accordance with a segment configuration on a glass-glazed substrate of beryllium oxide. A current flow through the metal segments will cause the generation of heat therein which makes a clearly distinct record on a heat-sensitive paper.

8 Claims, 6 Drawing Figures

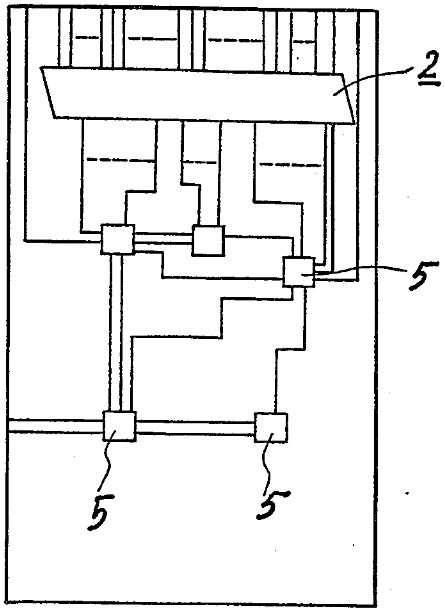
FIG. 2
FIG. 1
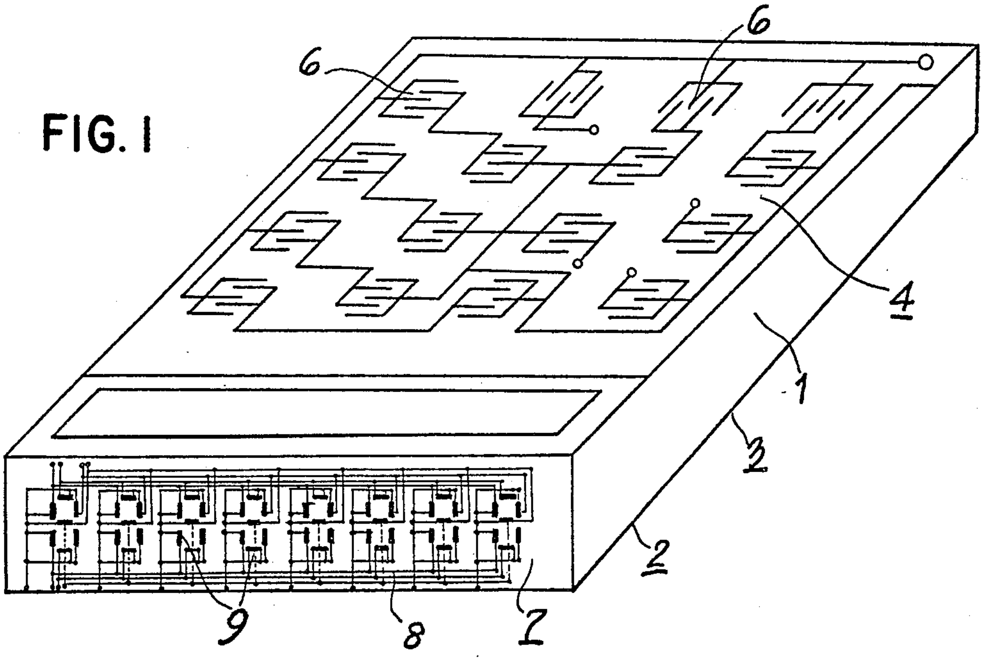

FIG. 3
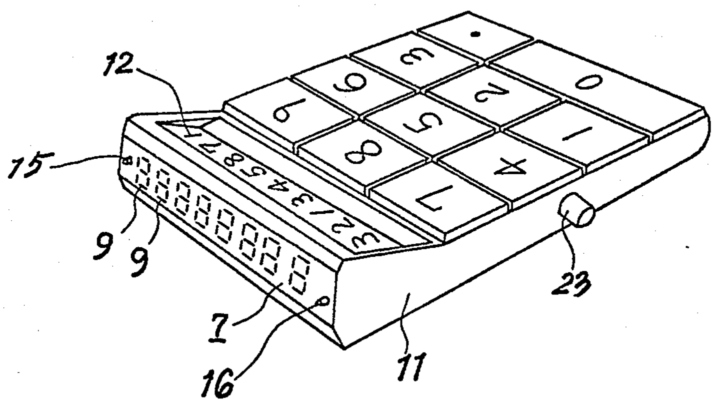
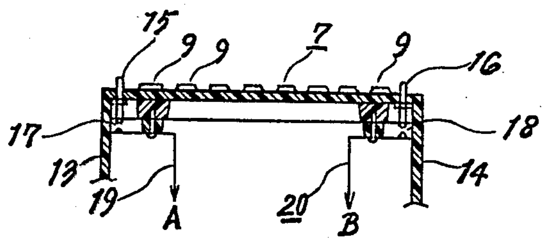
FIG. 4
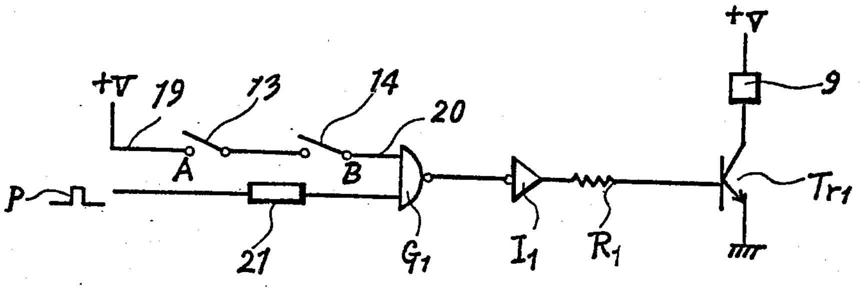
FIG. 5

CALCULATOR HAVING THERMAL PRINTING HEAD

This invention relates to a thermal printing calculator.

In the conventional printing calculators, data entries from a keyboard unit and operation results obtained by computations are printed on a roll of paper which is supported within the interior of the calculator. Therefore, it is not possible to print data on any desired type of sheet and thus the printed messages should in general be transcribed on a different sheet for the purpose of book keeping, statistics, etc..

It is therefore an object of the instant invention to provide a calculator having a thermal printing head capable of printing information applied thereto on any desired type of sheet in a stamp-like manner.

It is another object of the invention to provide a calculator having a thermal printing head capable of minimizing power dissipation by provision of a switch which controls the operation of the thermal printing head.

The above and further objects, features and advantages of the invention will become more apparent when read in the following detailed description of the invention with reference to accompanying drawings, in which:

FIG. 1 is a perspective view of a dielectric substrate carrying a thermal printing head at the side wall thereof;

FIG. 2 is a rear view of the dielectric substrate of FIG. 1;

FIG. 4 is a sectional view of the calculator of FIG. 3; and

FIG. 5 is a circuit diagram of a control circuit for the thermal printing head.

Figure 3:
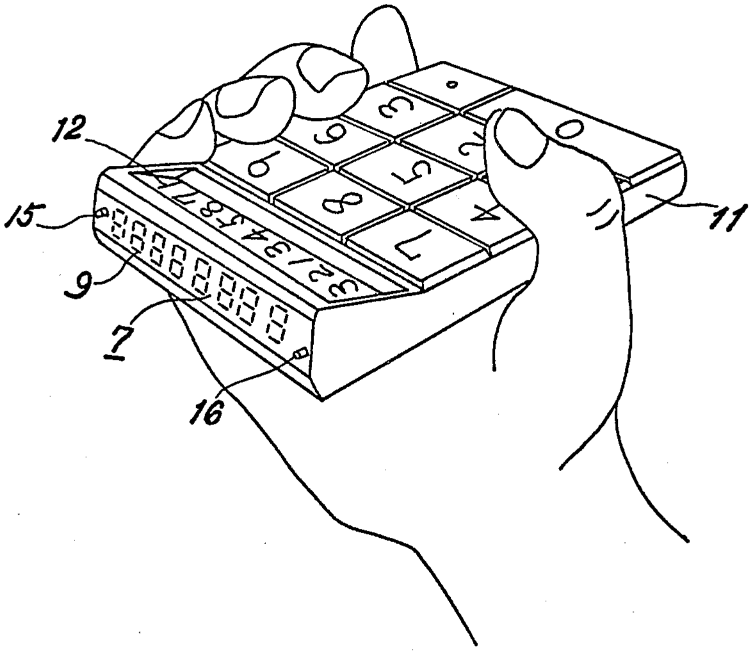
FIGS. 3 and 3(*a*) are perspective views of one form of an electronic calculator embodying the invention.

Referring now to FIGS. 1 and 2, there is illustrated a substrate 1 of electrically insulating material on which constitutional functional units are deposited, namely, a multi-digit display unit 2 employing liquid crystal systems, fluorescence indicator tubes, light-emitting diodes, etc., an integrated circuit unit 3 including various arithmetic and logic circuit elements and a mechanical contact type keyboard unit 4 for manually introducing digit information and functional commands into the integrated circuit 3. More specifically, the dielectric substrate 1 has two major surfaces one carrying only the keyboard unit 4 and the other carrying the integrated circuit unit 3 and the multi-digit display unit 2. These units are incorporated on the same substrate 1 by application of solid state electronics. Interconnections also are provided between these units. In the illustrated form, the multi-digit display unit 2 comprises a plurality of liquid crystal display elements of the known construction which has, for example, a layer of nematic liquid crystal composition together with a pair of electrode plates. The substrate 1 forms a electrode supporting plate for the liquid crystal display unit. The integrated circuit unit 3 comprises one or more LSI (large-scale integration circuit) elements 5. The keyboard unit 4 comprises comb-shaped fixed electrodes 6 for key switches or contacts formed by thick layer printing technology using gold paste, silver paste or other proper materials in addition to snap-acting movable members of such as conductive rubber not shown in the drawings. The liquid crystal display unit 2, the integrated circuit unit 3 and the keyboard unit 4, which are unified as a single component on the same substrate 1 in this way, are accommodated in a housing of for example plastic material.

In accordance with the teachings of the invention, a thermal printing head 7 is provided at the side wall of the dielectric substrate 1 in order to enable stamp-like printing operation. In a typical form, glass-glazed beryllium oxide BeO is employed as a structural support for an array of thermal printing element or heat generating elements. The glass-glazed beryllium oxide BeO is of a relatively high heat conductivity to ensure high speed and well defined printing. Over the glass-glazed layer there is deposited in a desired pattern an array of resistor elements 9 by evaporation of appropriate metal such as platinum or nickel-chrome alloy, which is not an easily oxidizable metal in air. A current flow through the metal layer will cause the generation of heat therein. Interconnections 8 between these metal segments also are provided by thick layer printing technology. In housing the thus obtained substrate 1 in a casing, the thermal printing head provided at the side wall of the substrate is open to the ambient environment for making a record in a stamp-like fashion on any desired type of heat-sensitive paper.

FIGS. 3 and 4 illustrate one form of an electronic calculator which is equipped at the top wall of the casing 11 with the thermal head 7 containing as discussed above a plurality of sets of segment-shaped heat generating metal layers 9. In order to print data entries and operation results, the metal segments 9 are selectively energized to cause heat and enable a record when the thermal head 7 comes into contact with a heat-sensitive paper, and is carried out after confirmation with the display contents on a display unit 12 such as liquid crystal units or light-emitting diodes. Time is required from mannual key operation to completion of the printing. Consequently, provision of a switch is desirable in view of the following reason. In the event that the metal segment array is activated immediately after generation of data to be printed, the temperature of the activated metal segments will fall to a low level when it is desired to effect the printing since information maintenance period is considerably short for example 100–200m sec. Alternatively, if such data is maintained for a longer period of time and the metal segments are activated at all times, it is not suited for battery powered calculators due to a considerable increase in power dissipation. A current flow through the metal segments initiates in response to open and close states of the above described switch.

To this end, in the illustrative form, a pair of switch structures 13, 14 are provided at both sides of the thermal head to control the energization for the metal segments. The switch structures 13, 14 contain respectively activator rods 15, 16 one ends of which are projected higher than the thermal head mesa and the other ends of which are operatively associated with their switch contacts 17, 18. The contacts 17, 18 are coupled via leads 19, 20 with the metal segment array in the manner to be described below. Upon the shunting of a path between points A and B current may be allowed to flow through the segment array.

As illustrated in FIG. 5, a buffer storage 21 holds temporarily data P to be presently printed and provides one input to an AND gate G1. When the calculator is hand held as illustrated FIG. 3(*a*) and the thermal printing head 7 is pushed against any desired type of paper, the switch structures 13, 14 are in their closed states such that the output of the buffer 21 is sent via an inverter $I_1$, which in turn is changed to its conductive state to energize the metal segment heating elements 9. Under these circumstances the printing can be performed on the heat-sensitive paper. The use of the pair of switch structures is to ensure uniform record on the heat-sensitive paper.

In the above description the switch structures 13, 14 are adapted to open and close automatically in response to the pressing of the thermal head 7 against the heat-sensitive paper. As an alternative, a manual switch 23 may be provided at a position of the casing where the operator holds the calculator in his hand, the switch 23 being connected between the points A, B in FIG. 5. In the case where both the display unit 12 and the thermal printing unit 7 are of the same segment configuration, enable signals may be used in common for the display unit 12 and the thermal printing unit 7. In this case the data to be printed is first displayed on the display unit 12 upon mannual depression of the switch 23 for the purpose of confirmation and later may be printed in the stamp-like fashion on the heat-sensitive paper. This will result in a reduction in power dissipation occurring in the display unit 12. Needless to say, the enable signals for the displaying and the printing may be clearly distinct. Although the thermal printing head is positioned at the side wall of the casing 11 in the illustrative form, it may be positioned at the bottom wall of the casing 11.

It is to be understood that the above-described embodiments are simply illustrative of the principles of the invention and that many embodiments may be devised without departing from the scope and spirit of the invention. The substrate carrying the keyboard unit, the display unit and the integrated circuit unit thereon as illustrated in FIGS. 1 and 2 but having no thermal printing head is disclosed and claimed in a copending application in the names of Isamu Washizuka, Shintaro Hashimoto and Saburo Katsui, entitled "Calculator Construction And Method For Making Calculator", Serial No. 403,857 filed October 5, 1973 now abandoned and assigned to the present assignee.

What is claimed is:

1. In an electronic calculator having a housing, keyboard means on said housing for entering numeral and function specifying information into said calculator, computation means disposed within said housing for performing computations on said entered information, and display means on said housing for displaying computation results from said computation means, the improvement comprising:

thermal print head means disposed on an external surface of said housing for printing said computation results on a heat-sensitive member which is brought into contact with said print head means from a position externally of said housing; and switch means for supplying heating current to said thermal print head in response to said contact between said print head means and said heat-sensitive member.

2. An electronic calculator as set forth in claim 1 wherein said thermal printing head comprises a dielectric substrate and an array of heat-generating metal layers overlaying said dielectric substrate.

3. An electronic calculator as set forth in claim 2 wherein said dielectric substrate is made of beryllium oxide having a considerably high heat conductivity.

4. An electronic calculator as set forth in claim 1 wherein said switch means comprises a pair of switches disposed at opposite ends of said thermal print head, each of said switches having actuator means for supplying heating current to said print head in response to contact between said heat-sensitive member and said actuator means, and circuit means for precluding the supply of said heating current unless both of said actuator means are in contact with said heat-sensitive member.

5. An electronic calculator according to claim 1 wherein there is further provided storage means for receiving said computation results, said computation results being applied to said print head in response to said contact between said print head and said heat-sensitive member.

6. An electronic calculator as set forth in claim 1 further comprising a common dielectric substrate for supporting said keyboard means, said computation means, said display means and said thermal print head.

7. In a portable electronic calculator having a housing, keyboard means on said housing for entering numeral and function specifying information into said calculator, computation means disposed within said housing for performing computations on said entered information, and display means on said housing for displaying computation results from said computation means, the improvement comprising:

thermal print head means rigidly affixed to and disposed on an external surface of said housing for printing said computation results on a heat-sensitive member which is brought into contact with said print head means from a position externally of said housing; and switch means for supplying heating current to said thermal print head when said print head is brought into contact with said heat-sensitive member.

8. In a portable electronic calculator having a housing, keyboard means on said housing for entering numeral and function specifying information into said calculator, computation means disposed within said housing for performing computations on said entered information, and display means on said housing for displaying computation results from said computation means, wherein the improvement comprises:

thermal print head means rigidly affixed to and disposed on an external surface of said housing for printing said computation results on a heat-sensitive member which is brought into contact with said print head means from a position externally of said housing; and manual switch means for energizing said display means for displaying said computation results thereon.

* * * * *